June 3, 1930. P. H. ZENTNER 1,761,285
SAFETY TURN LIGHT
Filed July 23, 1927
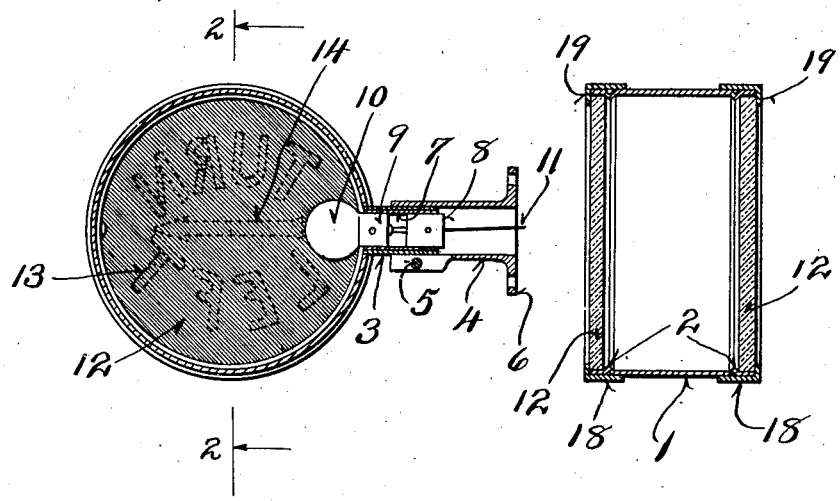
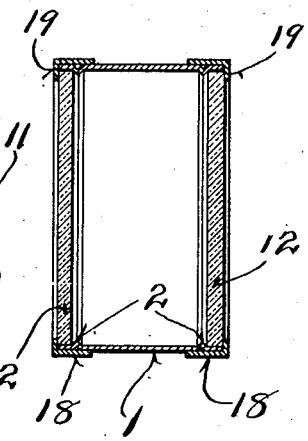
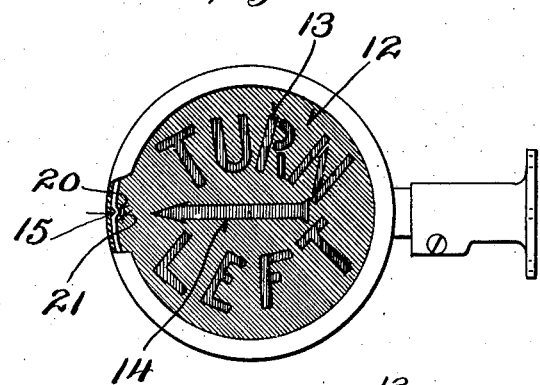
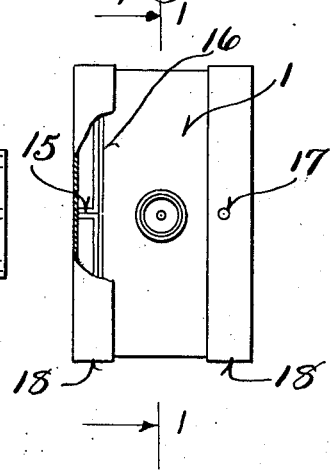
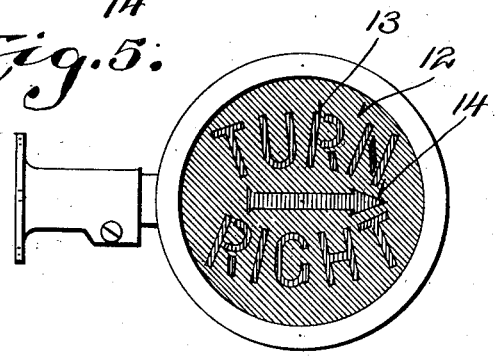
Inventor
Paul H Zentner Patented June 3, 1930

1,761,285

UNITED STATES PATENT OFFICE

PAUL H. ZENTNER, OF MILWAUKEE, WISCONSIN

SAFETY TURN LIGHT

Application filed July 23, 1927. Serial No. 207,918.

This invention relates to a safety turn light, particularly adapted for use on automobiles.

Objects of this invention are to provide a novel form of safety light which is so constructed that it may be readily attached to the side of an automobile and it is preferable to form these lights in pairs, one of which carries the insignia "Turn left" and the other of which may carry the insignia "Turn right." Preferably, the safety lights are provided with arrows pointing outwardly and objects of this invention are to provide a form of light in which the turn signal is given both to the front and to the rear of the automobile.

Further objects are to provide a novel form of signal light which is of a very simple construction and which holds the lenses in place in a novel and simple manner without requiring any auxiliary fastening means.

Further objects are to provide a signal light in which the lenses are formed with a colored body and with colored raised letters so that the letters stand out in a contrasting manner. Preferably, the coloring of the letters and of the body are complementary.

An embodiment of the invention is shown in the accompanying drawings in which:

Figure 1 is a longitudinal sectional view through the light corresponding to a section on the line 1—1 of Figure 4;

Figure 2 is a sectional view on the line 2—2 of Figure 1;

Figure 3 is a side elevation of the light with parts broken away;

Figure 4 is a rear view of the light detached from the bracket.

Figure 5 is a side elevation of a light indicating a right turn.

Referring to the drawings, it will be seen that the signal light comprises a cylindrical casing 1 preferably formed of metal and provided with a pair of spaced beads 2. The member 1 is welded or otherwise rigidly secured to a sleeve 3, as may be seen from Figure 1, and the sleeve is received within one end of a tubular bracket 4. The bracket 4 is provided with a split portion adapted to be clamped about the sleeve 3 by means of the screw or bolt 5. It is preferably provided with an apertured flange 6 by means of which it may be riveted or otherwise secured to the side of an automobile. The sleeve 3 carries the conventional type of lamp sleeve 7 which, when the parts are clamped together, is firmly retained in place. This lamp sleeve is provided with bayonet slots at opposite ends in the usual manner adapted to receive the projecting studs of a connecting or socket member 8 and the shank or base 9 of an electric lamp 10. Preferably, a single contact lamp is employed as illustrated in Figure 1. The other side of the circuit is connected through the metal of the bracket and sleeve. A single conductor 11 extends inwardly from the connecting member 8 as indicated in Figure 1.

The signal light is provided with front and rear colored lenses 12 which are of similar construction and of similar coloring. These lenses are formed of glass and are provided with raised letters 13 which are differently colored. They are also each provided with an arrow 14 which is also raised and colored similar to the letters. It is preferable in the form of the invention shown, to provide red letters on a green background.

It is to be noted that the cylindrical casing or member 1 is provided with a depressed longitudinally extending short channel 15 which opens through its edge. A similar channel is formed on the front and rear edge of the member 1 and preferably these channels are duplicated on opposite sides of the device. The channels 15 open into peripheral channels 16, as shown in Figure 4, and these channels are adapted to receive the depressed lugs 17 formed on the cylindrical flanges 18 of closure ring caps. These caps, as shown most clearly in Figure 2, are also provided with inwardly extending annular flanges 19 which overhang the marginal portion of the lenses and thus hold them against outward motion. These lenses bear at their inner peripheral edges against the ribs 2 formed by the channels 16, as shown in Figure 2.

Further, it is to be noted that the formation of the channels 15 produces projecting portions or ribs 20 (see Figure 3) and these projecting portions are received within recesses 21 or notches formed in the margin of the lenses 12. They thus keep the lenses from turning as is apparent from an inspection of Figure 3.

It is a very simple matter to replace a lens or to renew the lamp. All that is necessary is to rotate one of the cap members until the depressed portion 17 which rides within the corresponding peripheral groove 16 arrives at the outwardly extending groove 15. Thereafter the cap member may be removed and the lens may be then taken out, thus giving access to the lamp. It is preferable to duplicate the members 17 and the groove 15 on diametrically opposite sides of the device to aid in the security of attachment.

In using the device it is apparent that when positioned on the side of the automobile, it projects outwardly therefrom and when illuminated gives a very pronounced signal and one easily understood. The lamp on the appropriate side of the automobile is lighted by a switch under the control of the driver and the light on that side of the automobile together with the illuminated insignia and arrow, apprise either an approaching or a following driver of the direction in which the turn is to be made.

It is thus apparent that a very simple signal device has been provided which is of eminently practical construction, which may be easily installed, and which may be cheaply manufactured.

Although the invention has been described in considerable detail, such description is intended as illustrative rather than limiting as the invention may be variously embodied and as the scope of such invention is to be determined as claimed.

I claim:

1. A signal light comprising a casing, an electric lamp mounted within said casing, said casing having an open end, said casing having an inwardly pressed annular rib adjacent the end providing an annular groove on the outer side of said casing, a lens in the end of said casing contacting at its inner edge with said rib, a closure cap disposed over the end of the casing and having a cylindrical portion enclosing the end of said casing and provided with spaced inwardly directed projections normally seated in said annular groove, said casing having other grooves extending axially from its outer end to said annular groove.

2. A signal light comprising a casing, an electric lamp mounted within said casing, said casing having an open end, said casing having an inwardly pressed annular rib adjacent the end providing an annular groove on the outer side of said casing, a lens in the end of said casing contacting at its inner edge with said rib, a closure cap disposed over the end of the casing and having a cylindrical portion enclosing the end of said casing and provided with spaced inwardly directed projections normally seated in said annular groove, said casing having other grooves extending axially from its outer end to said annular groove and forming ribs upon the interior of the casing, said lens having notches in the periphery thereof to receive said ribs.

In testimony that I claim the foregoing I have hereunto set my hand at Milwaukee, in the county of Milwaukee and State of Wisconsin.

PAUL H. ZENTNER.